Patented Mar. 26, 1935

UNITED STATES PATENT OFFICE 1,995,806

ANTHRAQUINONE DERIVATIVES AND PROCESS OF MAKING SAME

Hermann Hauser, Basel, and Max Bommer, Riehen, near Basel, Switzerland, assignors to firm Society of Chemical Industry in Basle, Basel, Switzerland No Drawing. Original application May 31, 1932, Serial No. 614,610. Divided and this application March 30, 1933, Serial No. 663,656. In Switzerland June 29, 1931

10 Claims. (Cl. 260—46)

This application is a division of our application for patent Serial No. 614,610 filed in the United States of America on May 31, 1932, and in Switzerland on June 29, 1931, of which the following is a full, clear, and exact specification.

This invention relates to the manufacture of new anthraquinone derivatives and their application as dyestuffs. It comprises the process of making these derivatives as well as the derivatives themselves.

The invention is based on the observation that in 1-acylamino-3-halogen-anthraquinones, obtainable for example by acylating 1-amino-3-halogen-anthraquinones, the halogen may be exchanged in a surprisingly smooth manner, with elimination of hydrogen halide or a salt thereof, for the most various residues.

The reaction is carried out by causing compounds containing at least one replaceable atom of hydrogen or a metal attached to nitrogen, oxygen or sulfur to react on 1-acylamino-3-halogen-anthraquinones.

Among the 1-acylamino-3-halogen-anthraquinones which may be used in the present process the following may for example be mentioned:—1-formylamino-3-bromanthraquinone, 1-acetylamino-3-bromanthraquinone, 1-benzoylamino-3-bromanthraquinone, 1-(4'-chloro)-benzoylamino-3-chloranthraquinone, 1-naphthoylamino-3-chloranthraquinone, 1-(2-ethoxy-)naphthoylamino-3-bromanthraquinone, 1-benzene-sulfamino-3-bromanthraquinone, 1-naphthalenesulfamino-3-chloranthraquinone, 1-(1'-anthraquinonecarbonyl-)amino-3-chloranthraquinone, 1-(2'-anthraquinonecarbonyl-)amino-3-bromanthranquinone.

Compounds containing at least one replaceable atom of hydrogen or a metal attached to nitrogen, oxygen or sulfur, and which may be converted with the 1-acylamino-3-halogen-anthraquinones are for example the following:—alcoholates, phenolates, xanthates, mercaptans, thiophenols, thionaphthols, sulfamides, ammonia, primary and secondary amines of the aliphatic or aromatic series, such as methylamine, glycocoll, aniline, toluidine, phenylenediamine, naphthylamine, or the highly condensed ring systems, such as aminoanthraquinones, aminopyranthrones, aminoanthanthrones, aminodibenzanthrones.

The reaction of the 1-acylamino-3-halogen-anthraquinones with the compounds just named is preferably carried out in a diluent of high boiling point in presence of agents that bind acids, such as anhydrous sodium acetate, potassium acetate, calcined alkali carbonates, copper oxide, magnesium oxide, and of catalysts, such as metallic copper and its compounds. The yields are generally approximately quantitative, and the products of the reaction are almost always obtained in crystalline form.

The products obtained in this manner may already themselves be valuable dyestuffs, but they may also be used as intermediate products for making further dyestuffs.

These latter are obtained by treating with condensing agents those products which are obtained by the reaction of compounds containing at least one replaceable atom of hydrogen or a metal attached to nitrogen, oxygen or sulfur with 1-acylamino-3-halogen-anthraquinones. Particularly valuable dyestuffs are obtained in the treatment with condensing agents, probably under carbazolation, from those products which are obtainable by reacting with the cited highly condensed ring systems on 1-acylamino-3-halogen-anthraquinones.

As condensing agents there may for example be mentioned concentrated sulfuric acid, chlorsulfonic acid, fluor-sulfonic acid, aluminium chloride as such, or mixed with alkali halides, or in presence of organic bases, or as an ammonia double compound.

The new anthraquinone derivatives obtainable according to the present process yield in dyeing valuable tints of very good fastness properties. For dyeing they can also be used in the form of their leuco-compounds, for instance their leuco-esters.

The following examples illustrate the invention, the parts being by weight:—

Example 1

12 parts of 1-benzoylamino-3-bromanthraquinone, 8 parts of 1-aminoanthraquinone, 8 parts of potassium acetate, 1 part of copper acetate and 200 parts of nitrobenzene are heated together to boiling for 6 hours while stirring. The whole is filtered at 50° C. and the solid matter is washed with nitrobenzene, then with alcohol and finally with hot water. There are obtained 11 parts of a red crystalline powder. This product of the probable formula

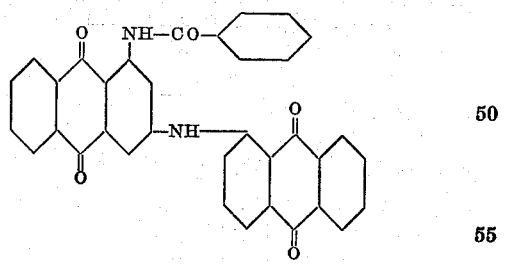

dissolves to a pure blue solution in concentrated sulfuric acid or chlorsulfonic acid. When precipitated from concentrated sulfuric acid solution the dyestuff dyes cotton in a cold or warm vat a strong brick red of very good properties of fastness.

Example 2

10 parts of 1-benzoylamino-3-bromanthraquinone, 9 parts of 1:5-monobenzoyldiaminoanthraquinone, 5 parts of anhydrous sodium acetate, 1 part of copper acetate and 150 parts of nitrobenzene are heated together to boiling for 6 hours and the mass is worked up as described in Example 1. There are obtained well formed small red needles in a yield of more than 90 per cent. of that indicated by theory. By precipitating the dyestuff of the probable formula

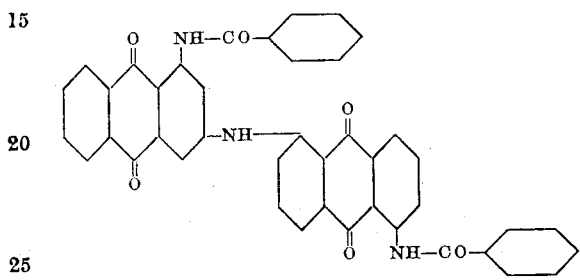

from sulfuric acid of 93 per cent. strength at a temperature below 5° C. there is obtained a red paste. This compound dyes cotton in a cold or warm hydrosulfite vat strong brownish red tints of good properties of fastness.

When 1:8-monobenzoyldiaminoanthraquinone is used instead of the 1:5-compound a similar dyestuff of the probable formula

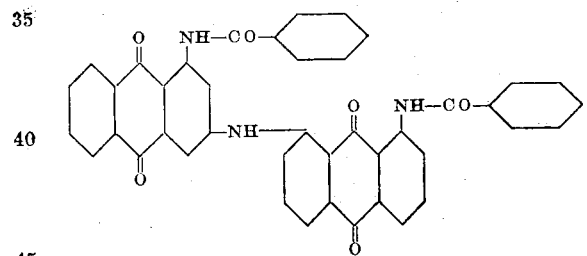

of very good properties of fastness is obtained.

Example 3

5 parts of the compound obtainable as described in the first paragraph of Example 2 are introduced at 0–5° C. into 50 parts of chlorosulfonic acid and the whole is then stirred for 1 hour at 30–35° C. The pure blue solution becomes dirty brown after a few minutes and then gradually reddish blue. It is now diluted at 0–5° C. with 50 parts of sulfuric acid of 80 per cent. strength and the mass is poured upon ice and then filtered. The neutral press cake is treated with dilute sodium hypochlorite solution for 2½ hours at 70–75° C. After filtering and drying the solid matter of the probable formula

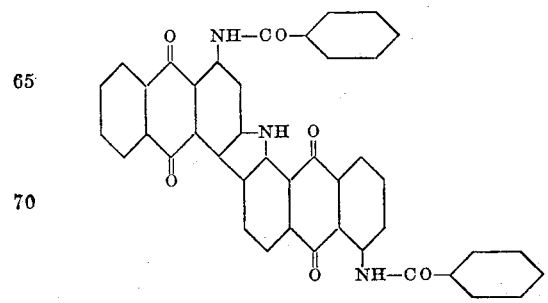

there is produced a shining red powder which dyes cotton in the vat very vivid and strong orange tints which exhibit very good properties of fastness.

Example 4

10 parts of 1-benzoylamino-3-bromanthraquinone, 2.4 parts of 1:5-diaminoanthraquinone, 5 parts of anhydrous sodium acetate, 1 part of copper acetate and 150 parts of nitrobenzene are together heated to boiling for 6 hours as described in Exemple 1. The new compound of the probable formula

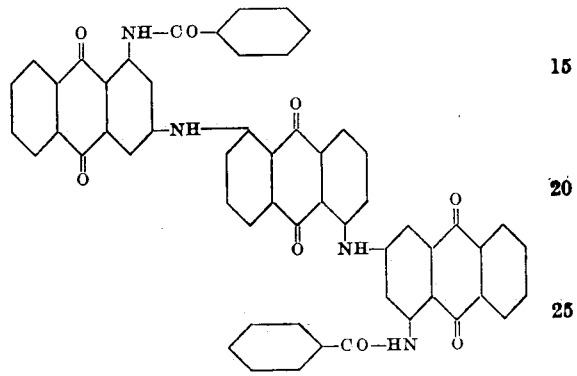

is isolated by filtration at about 50° C. It is a red crystalline powder, which after precipitation from concentrated sulfuric acid solution dyes cotton in the vat strong bordeaux tints of very good properties of fastness.

Example 5

A mixture of 10 parts of 1-benzoylamino-3-bromanthraquinone, 10 parts of 1:4-monobenzoyldiaminoanthraquinone, 5 parts of potassium acetate, 1 part of copper acetate and 200 parts of nitrobenzene is converted as described in Example 1, into the corresponding anthrimide of the probable formula

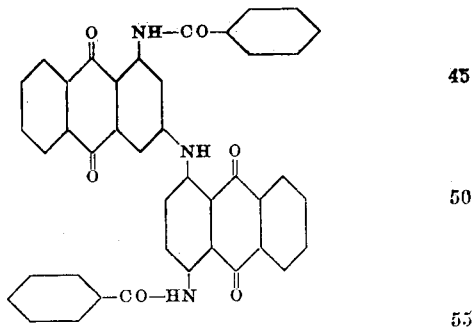

When this is treated with acid condensing agents, such as chlorosulfonic acid or sulfuric acid, at ordinary temperature for a short time there is obtained by dilution with water, filtration and drying, a brown powder of the probable formula

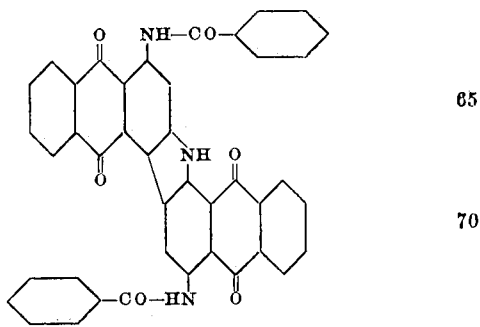

which dyes cotton in a cold or warm vat very strong brown tints exhibiting good properties of fastness.

Example 6

1 gram of the dyestuff made as described in Example 3, 5 cc. of caustic soda solution of 36° Bé. and 100 cc. of water at 25–30° C. are made into a paste, 2 grams of hydrosulfite conc. powder are added and vatting is continued for ½ hour at the above temperature. To this dye-bath there are added 3 cc. of caustic soda solution of 36° Bé. and 1 gram of hydrosulfite and the whole is made up, including the stock vat, to 2 litres and the stock vat is added. The goods are entered at 25–30° C. and handled for ¼ hour. There are then added 20 grams of sodium chloride or calcined sodium sulfate and dyeing is continued for 1 hour at 25–30° C. After winding off, the goods are oxidized for ½ hour in the air, rinsed, scoured, rinsed and soaped at the boil. Orange tints are obtained.

Example 7

40 parts of aluminium chloride are slowly introduced into 40 parts of pyridine so that the temperature does not rise above 100° C. To this mixture 10 parts of the condensation product obtained as described in Example 1 from 1-benzoylamino-3-bromanthraquinone and 1-aminoanthraquinone are then added, and the whole is heated for 1 hour in a reflux apparatus. The fusion mass, while still hot, is then poured into an alkaline aqueous hydrosulfite solution of about 40° C. and stirred for a short time. A brown solution is thus obtained from which the dyestuff of the probable formula

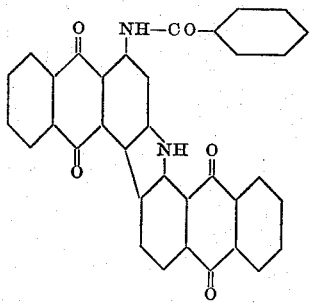

may be separated by vigorous stirring in the air, if necessary after preliminary filtration. By treatment with an aqueous sodium hypochlorite solution the dyestuff is obtained in a somewhat purer state yet. When dry it is a brown powder. In concentrated sulfuric acid it dissolves to a red solution. Cotton is dyed from a cold and a warm vat very strong and fast yellow-brown tints.

What we claim is:—

1. Process for the manufacture of anthraquinone derivatives consisting in causing the products which are obtained by condensing 1-acylamino-3-halogen-anthraquinones with amines of the anthraquinone series to react with agents having a condensing action.

2. Process for the manufacture of anthraquinone derivatives consisting in causing the products which are obtained by condensing 1-acylamino-3-halogen-anthraquinones with amines of the anthraquinone series to react with acid agents having a condensing action.

3. Process for the manufacture of anthraquinone derivatives consisting in causing the products which are obtained by condensing 1-acylamino-3-bromanthraquinones with amines of the anthraquinone series to react with acid agents having a condensing action.

4. Process for the manufacture of anthraquinone derivatives consisting in causing the products which are obtained by condensing 1-benzoylamino-3-bromanthraquinones with amines of the anthraquinone series to react with acid agents having a condensing action.

5. Process for the manufacture of anthraquinone derivatives consisting in causing the products which are obtained by condensing 1-benzoylamino-3-bromanthraquinones with aminoanthraquinones to react with acid agents having a condensing action.

6. Process for the manufacture of anthraquinone derivatives consisting in causing the products which are obtained by condensing 1-benzoylamino-3-bromanthraquinones with aminoanthraquinones to react with sulfuric acids in which one hydroxyl group may be replaced by halogen.

7. Process for the manufacture of anthraquinone derivatives consisting in causing the products which are obtained by condensing 1-benzoylamino-3-bromanthraquinones with aminoanthraquinones to react with chlorosulfonic acid.

8. Process for the manufacture of an anthraquinone derivative consisting in causing the product which is obtained by condensing 1-benzoylamino-3-bromanthraquinone with 1-amino-5-benzoylaminoanthraquinone to react with chlorosulfonic acid.

9. Anthraquinone derivatives of the general formula

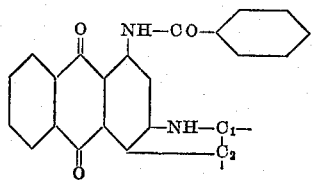

in which the two carbon atoms $C_1$ and $C_2$ belong to an anthraquinone nucleus wherein $C_1$ stands in $\alpha$-position and $C_2$ in $\beta$-position, which products form orange to red powders which dissolve in concentrated sulfuric acid to red to blue solutions and dye cotton from the vat red to black tints of very good fastness properties.

10. Anthraquinone derivatives of the general formula

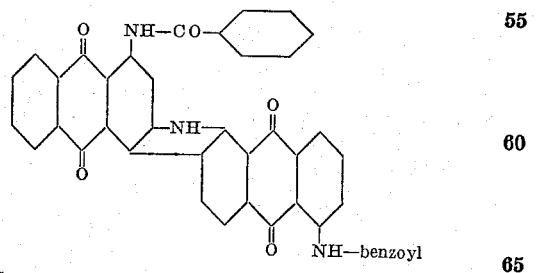

which products form orange powders which dissolve in concentrated sulfuric acid to brown solutions, and dye cotton from the vat orange tints of good fastness properties.

HERMANN HAUSER.
MAX BOMMER.